US009661708B1

(12) United States Patent
De Cicco et al.

(10) Patent No.: US 9,661,708 B1
(45) Date of Patent: May 23, 2017

(54) DRIVING SEVERAL LIGHT SOURCES

(71) Applicant: Infineon Technologies AG, Neubiberg (DE)

(72) Inventors: Adolfo De Cicco, Castel d'Azzano (IT); Maurizio Galvano, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/260,080

(22) Filed: Sep. 8, 2016

(51) Int. Cl.
*H05B 33/08* (2006.01)
*F21V 23/00* (2015.01)
*F21V 23/06* (2006.01)
*F21Y 115/10* (2016.01)

(52) U.S. Cl.
CPC ....... *H05B 33/0842* (2013.01); *F21V 23/006* (2013.01); *F21V 23/06* (2013.01); *H05B 33/0887* (2013.01); *F21Y 2115/10* (2016.08)

(58) Field of Classification Search
CPC ............ H05B 33/0815; H05B 33/0818; H05B 33/0842; H05B 33/0845; H05B 33/0848; H05B 33/0851; Y02B 20/348
USPC ................... 315/291, 294, 307, 312
See application file for complete search history.

(56) References Cited

U.S. PATENT DOCUMENTS

| 9,030,122 B2* | 5/2015 | Yan ................ H05B 33/0818 315/291 |
| 9,402,286 B2* | 7/2016 | Lin ................ H05B 33/0815 |
| 2016/0345392 A1* | 11/2016 | Scenini ................ G09G 3/00 |
| 2016/0345397 A1* | 11/2016 | De Cicco ........... H05B 33/0842 |

OTHER PUBLICATIONS

U.S. Appl. No. 15/260,055, by Maurizio Galvano et al., filed Sep. 8, 2016.

* cited by examiner

*Primary Examiner* — Haissa Philogene
(74) *Attorney, Agent, or Firm* — Shumaker & Sieffert, P.A.

(57) ABSTRACT

A device for driving several light sources is provided, wherein the several light sources are arranged in a light matrix structure, the device comprising a common circuitry and a driver matrix; wherein each cell of the driver matrix is connected to at least one cell of the light matrix structure; wherein a sense component is provided on a cell of the driver matrix, wherein the sense component determines a sense signal that is based on, and in particular dependent on or proportional to, an output signal driving the light source that is connected to this cell of the driver matrix; wherein the common circuitry comprises an adjustment circuitry that is arranged for obtaining the sense signal, for adjusting a reference signal, and for conveying the reference signal to the cell of the driver matrix that determined the sense signal; wherein the cell of the driver matrix is arranged for adjusting the output signal driving the light source based on the reference signal. Also, an according method is suggested.

20 Claims, 10 Drawing Sheets

DRIVING SEVERAL LIGHT SOURCES

BACKGROUND OF THE INVENTION

Embodiments of the present invention relate to a device for driving several light sources. The light sources may in particular be LEDs arranged in a matrix structure (LED array).

SUMMARY

A first embodiment relates to a device for driving several light sources, wherein the several light sources are arranged in a light matrix structure,
  the device comprising a common circuitry and a driver matrix;
  wherein each cell of the driver matrix is connected to at least one cell of the light matrix structure;
  wherein a sense component is provided on a cell of the driver matrix, wherein the sense component determines a sense signal that is based on, and in particular dependent on or proportional to, an output signal driving the light source that is connected to this cell of the driver matrix;
  wherein the common circuitry comprises an adjustment circuitry that is arranged
    for obtaining the sense signal;
    for adjusting a reference signal; and
    for conveying the reference signal to the cell of the driver matrix that determined the sense signal;
  wherein the cell of the driver matrix is arranged for adjusting the output signal driving the light source based on reference signal.

A second embodiment relates to a method for driving several light sources, wherein the several light sources are arranged in a light matrix structure, wherein each cell of a driver matrix is connected to at least one cell of a light matrix structure and wherein a common circuitry comprises an adjustment circuitry, the method comprising the steps:
  determining a sense signal that is based on, and in particular dependent on or proportional to, an output signal driving the light source that is connected to this cell of the driver matrix, wherein the sense signal is determined by a sense component that is provided on a cell of the driver matrix;
  obtaining the sense signal by the adjustment circuitry;
  adjusting a reference signal by the adjustment circuitry;
  conveying the reference signal from the adjustment circuitry to the cell of the driver matrix that determined the sense signal;
  adjusting by this cell of the driver matrix the output signal driving the light source based on reference signal.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Light sources, e.g., semiconductor light sources, LEDs (light emitting diodes), may be arranged together as an array. The array of light sources may be arranged on top of a semiconductor device (array) that is arranged as a control circuit for the light sources. The light sources may be mounted onto the semiconductor device. In case the semiconductor device provides a current source for each light source, such current source may have to be driven individually to allow controlling the respective light source.

Figure 1:
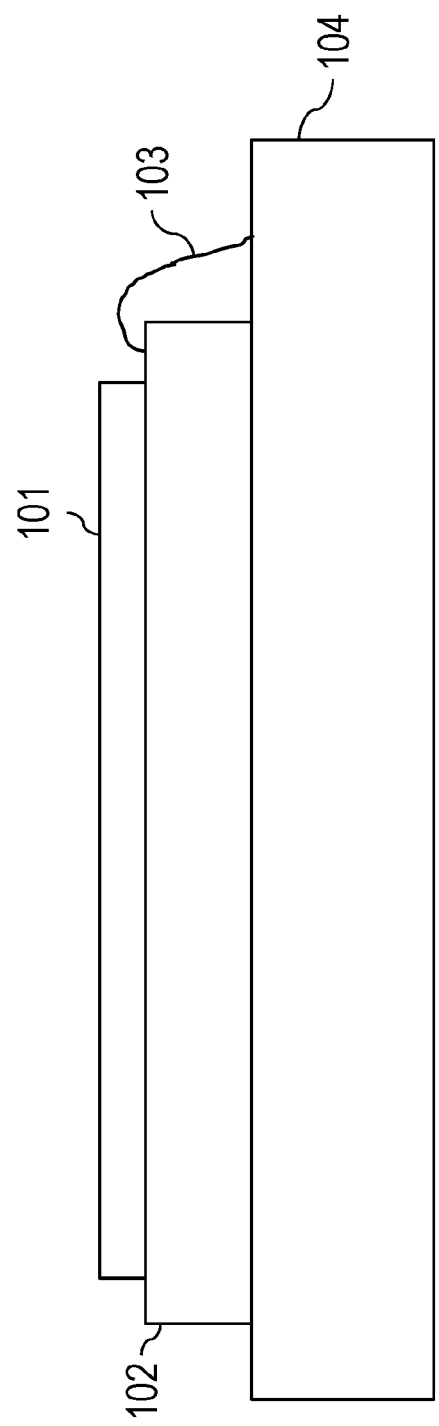
FIG. 1 shows an exemplary arrangement comprising an LED array which is placed on top of a semiconductor device.

FIG. 1 shows an exemplary arrangement comprising an LED array 101 which is placed on top of a semiconductor device 102. The semiconductor device 102 may be arranged on a printed circuit board (PCB) 104; it may be electronically connected via bond wires 103. The LED array 101 mounted on the semiconductor device 102 is also referred to as chip-on-chip assembly.

The semiconductor device 102 may comprise at least one of the following:
  current sources for the individual LEDs arranged on the LED array 101, in particular at least one current source for each LED;
  a communication interface for driving the LEDs and for management purposes;
  generation of at least one reference current; and
  diagnosis and protection functionality.

For such purpose, the semiconductor device 102 may comprise an array of silicon cells, wherein each silicon cell (also referred to as pixel cell) may comprise a current source, which may be directly connected to an LED of the LED array 101. In addition, the semiconductor device 102 may comprise a common circuitry.

Figure 2:
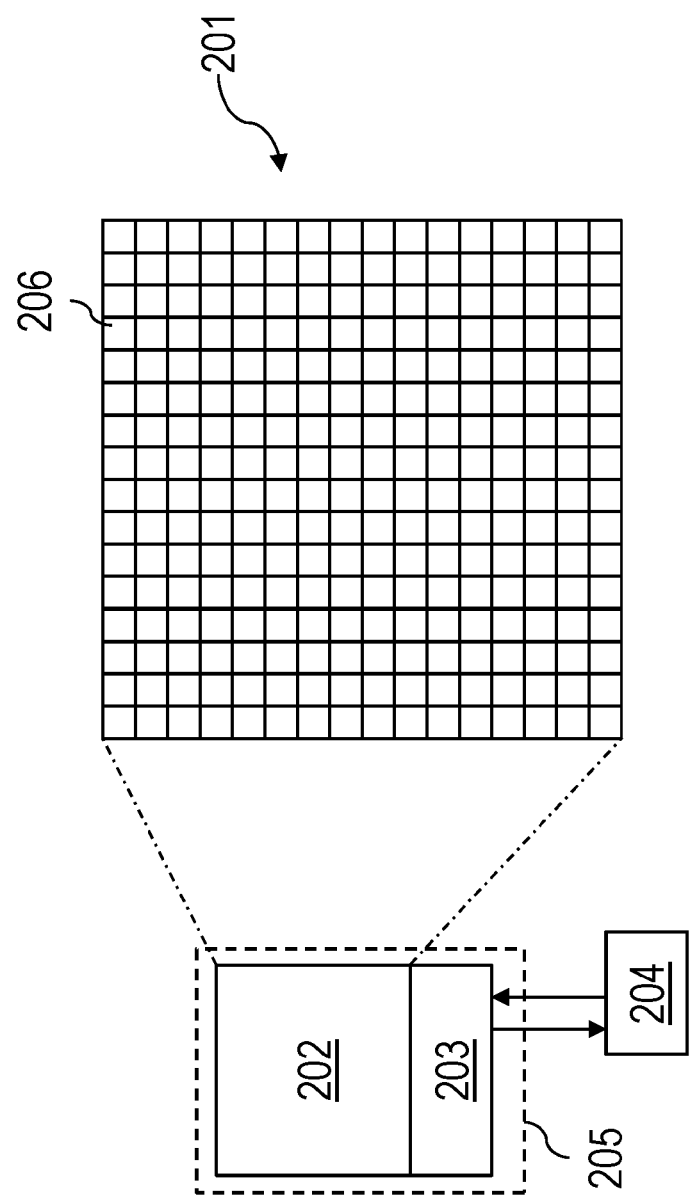
FIG. 2 shows an exemplary block diagram comprising a matrix of LEDs and a semiconductor device comprising an LED driver matrix and a common circuitry.

FIG. 2 shows an exemplary diagram comprising a matrix 201 of LEDs 206 (each pixel of the matrix may be represented by at least one LED) and a semiconductor device 205, which comprises an LED driver matrix 202 (i.e. a portion of the semiconductor device that is associated with one pixel of the LED array 101) and a common circuitry 203. The semiconductor device 205 may be connected to a serial interface 204. The respective LEDs 206 of the matrix 201 may be controlled via the serial interface 204. The matrix 201 may be arranged on top of the LED driver matrix 202. The LED driver matrix 202 may be part of the semiconductor device 102 as shown in FIG. 1 and it may comprise a pixel cell area (also referred to as "pixel cell") for each LED 206 of the matrix 201. It is an option that the LED driver matrix 202 has (e.g., substantially) the same area size as the matrix 201. In particular, the pixel cell area of the LED driver matrix 202 may have (substantially) the same surface area as the LEDs 206. The LEDs 206 of the matrix 201 may be directly connected to the pixel cells of the LED driver matrix 202. The matrix 201 may in particular be arranged on top of the LED driver matrix 202.

The common circuitry 203 may in particular comprise a serial interface for accessing the LEDs of the matrix 201, e.g., one register for configuration purposes, a reference current generator, a reference voltage generator and a temperature sensor.

The matrix 201 may comprise an arbitrary number of LEDs (pixels) arranged in columns and rows. The matrix 201 may comprise, e.g., 256 or 1024 LEDs. In the example shown in FIG. 2, the matrix 201 comprises 16 rows and 16 columns of LEDs 206 amounting to a total of 256 LEDs.

It is noted that LED is mentioned as an example for a light source. It may be an option to use any kind of light source, in particular semiconductor light source. It is another option that each light source may be a module comprising at least two semiconductor light sources.

The common circuitry 203 may be arranged in an area adjacent or distant to the LED driver matrix 202.

In an exemplary application, each pixel of the LED array 101 may consume a surface area amounting to, e.g., less than 150 μm². This value is only an exemplary value for an area. Any area suitable for a predetermined resolution of the LED array 101 may be selected. The semiconductor light source may be arranged in the middle of each pixel cell. Adjacent pixel cells may have a gap between light sources amounting to less than 150 μm. Each LED may have one contact connected to the LED driver matrix 202 and one contact connected to a common contact, e.g., GND. This is an exemplary scenario; other dimensions, distances and connections may apply accordingly.

With each LED being mounted directly on top of the semiconductor device, each current source is placed in an area defined by the surface area of the pixel cell. In the example provided above, the area may amount to $$150 \text{ μm} \cdot 150 \text{ μm} = 0.022500 \text{ mm}^2.$$

For increasing the resolution in x- and y-dimensions (e.g., 0.5°) of the light at long distance and for avoiding extra mechanical components for beam leveling adjustment, a short pitch between the pixel cells is beneficial. In the example provided above, the pitch between pixel cells may be less than 150 μm.

Due to the compact arrangement, a high amount of heat sources may generate different temperatures, which may influence temperature gradients and hence lead to a mismatch between pixels.

In addition, the output of each current source per pixel cell may not be directly accessible as the LED driver matrix is directly connected to the LEDs.

Hence, a solution may be desirable that provides at least one of the following:
- a current source that provides current to the individual LED, which allows switching the LED on or off with high accuracy, optionally providing over-current protection;
- a diagnostic functionality capable of detecting an open-load and a short to ground of the output channel;
- a low mismatch between different pixels, i.e. between different current sources.

Figure 3:
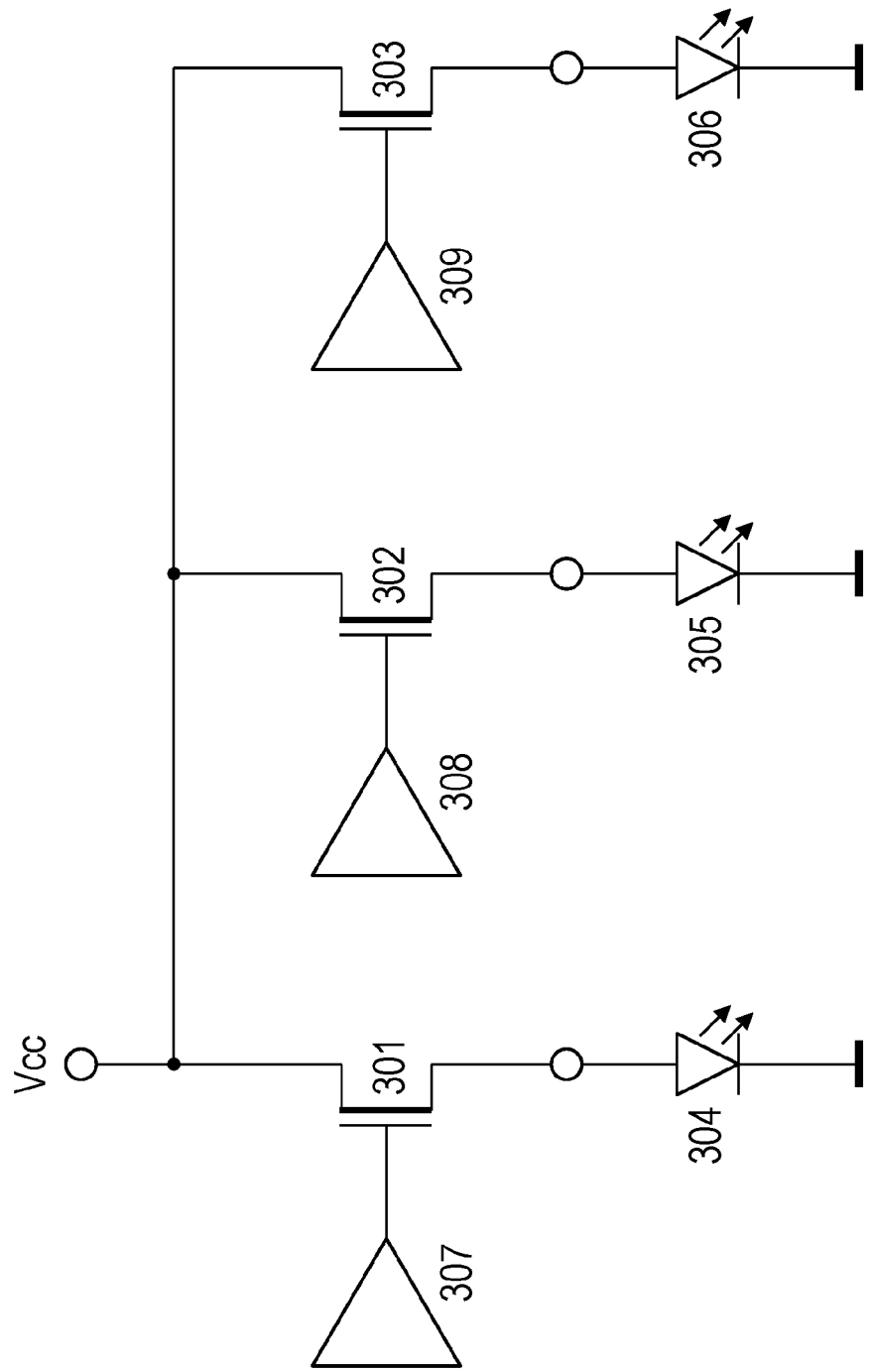
FIG. 3 shows high-side current sources, each of which being arranged on the LED driver matrix on top of which LEDs are mounted.

FIG. 3 shows high-side current sources 301 to 303, each of which being arranged on the LED driver matrix on top of which LEDs 304 to 306 are mounted. In this scenario, the LED 304 is arranged on top of the current source 301, the LED 305 is arranged on top of the current source 302 and the LED 306 is arranged on top of the current source 303.

Each current source 301 to 303 may be an NMOS power stage with its drain connected to a supply voltage Vcc and with its source connected towards the respective LED 304 to 306. The gate of each NMOS power stage may be controlled via an error amplifier 307 to 309.

The respective error amplifier 307 to 309 may be used to control the output current using an internal reference current. The error amplifier 307 to 309 can be enabled by a digital or by an analog signal.

An LED driver matrix may thus comprise a huge number of current sources and/or switches on the area available for a pixel cell (in case the LED driver matrix is below the LED array).

Examples presented herein in particular show how an efficient solution for the LED array and the underlying LED driver matrix may be realized even if the LED driver matrix is arranged on a silicon semiconductor device (e.g., single chip). Examples provided in particular cope with a high number of heat sources as well as heat gradients between current sources of the pixel cells.

Examples presented herein allow providing an LED driver matrix comprising in particular at least one of the following:
- a communication interface for controlling the drivers for each pixel cell;
- an output current regulation with self-protection against over-current;
- an open-load and short to ground diagnostic functionality; and
- a low temperature sensitivity.

This may in particular be achieved by distributing a control logic between a common circuitry and the LED driver matrix, both integrated on a semiconductor device. The common circuitry may be arranged adjacent to the LED driver matrix and the LED driver matrix may take the same surface area than the LED array, which can be arranged on top of the LED driver matrix as explained above.

As an option, the common circuitry may be arranged in an area adjacent or distant to the LED driver matrix.

A challenge is how to efficiently drive the current sources, wherein one current source is placed (or associated with) a pixel cell. As shown in the example described above, the distance between two pixel cells may set forth limiting restrictions, which makes it difficult to electrically connect all current sources that are arranged below their associated light sources such that they can be driven by the common circuitry of the semiconductor device.

Figure 4:
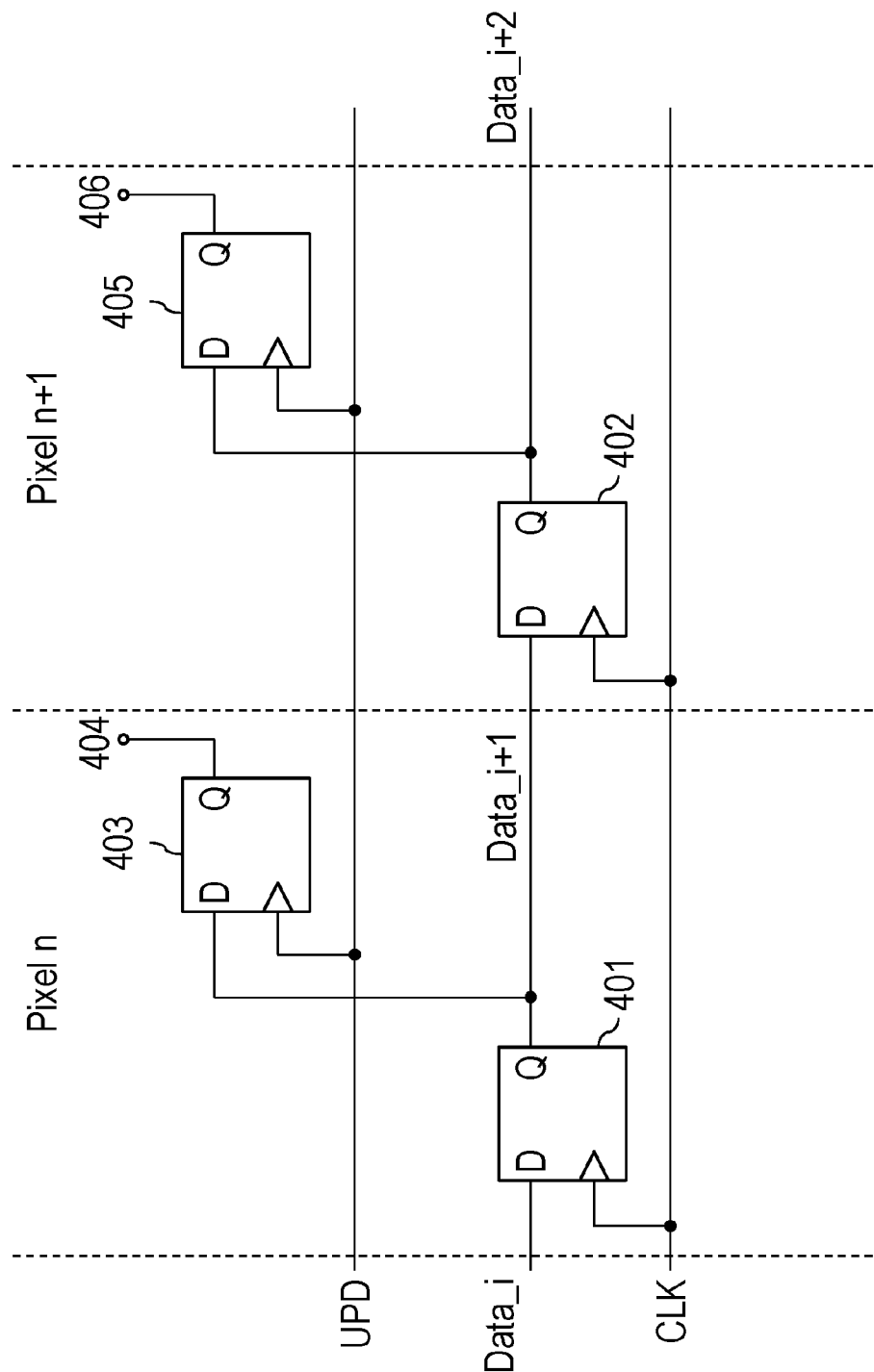
FIG. 4 shows a schematic block diagram of a pixel cell comprising a pixel addressing block, a driver and a comparator.

FIG. 4 shows an exemplary circuitry that may be arranged on the semiconductor device for two pixel cells n and n+1. This example suggests that the common circuitry supplies an update signal UPD, a data signal Data_i and a clock signal CLK. In the example, the pixel cell n provides a data signal Data_i+1 to the pixel cell n+1 and the pixel cell n+1 provides a data signal Data_i+2 to a subsequent pixel cell (not shown).

The data signal Data_i is a sequence of binary signals (e.g., "0" and "1") that are conveyed to a shift register. Each cell of the shift register may comprise a D-flip-flop, i.e. a D-flip-flop 401 for pixel n and a D-flip-flop 402 for pixel n+1. The data signal Data_i is connected to the D-input of the D-flip-flop 401, the Q-output of the D-flip-flop 401 is connected to the D-input of the D-flip-flop 402. Both D-flip-flops 401, 402 are also driven by the clock signal CLK.

Hence, a sequence of "0" and "1" values may be conveyed to the D-flip-flops 401, 402, wherein with each clock cycle (rising edge) of the clock signal CLK, the actual value stored in the D-flip-flop 401 is shifted to the subsequent D-flip-flop 402 and the next value provided by the data signal Data_i is stored in the D-flip-flop 401.

According to the example shown in FIG. 4, a bit sequence of first 0, then 1 is—after two clock cycles—stored in the D-flip-flops 401, 402 such that the D-flip-flop 401 has a value "1" and the D-flip-flop 402 has the value "0".

A light source, e.g., LED, for pixel n is driven via a terminal 404 of a register, e.g., a D-flip-flop 403, and a light source, e.g. LED, for the pixel n+1 is driven via a terminal 406 of a register, e.g., a D-flip-flop 405. The D-input of the D-flip-flop 403 is connected to the Q-output of the D-flip-flop 401 and the D-input of the D-flip-flop 405 is connected to the Q-output of the D-flip-flop 402. The enable (or clock) inputs of both D-flip-flops 403, 405 are connected to the update signal UPD. When the update signal UPD becomes "1" the value stored in the D-flip-flop 401 becomes visible at the Q-output of the D-flip-flop 403 and hence is used to drive the light source for this pixel n. Accordingly, the value stored in the D-flip-flop 402 becomes visible at the Q-output of the D-flip-flop 405 and hence is used to drive the light source of pixel n+1.

Hence, the shift register exemplarily shown in FIG. 4 comprises two cells, wherein the cell for pixel n comprises the D-flip-flop 401 and the register 403 and the cell for pixel n+1 comprises the D-flip-flop 402 and the register 405. The register may be implemented as a flip-flop, in particular as a D-flip-flop.

FIG. 4 shows only an exemplary excerpt of a sequence of two pixel cells. This approach, however, may be applied to a sequence of more than two pixel cells, e.g., a column or a row of a matrix of pixels. In addition, several rows or columns may be connected and represented by an even longer shift register. Insofar, the shift register can be used for providing a data signal to all pixels of a column or line or even matrix and to update the column, line or matrix at once.

The frequency of the clock signal CLK may advantageously be high enough to fill the shift registers for such sequence of pixels before the update signal UPD is activated and before the values stored at that time in the respective shift register are used to control the pixels of this sequence, e.g., column or row of the matrix of pixels. Hence, a high refresh rate for each pixel may result in a high resolution of a PWM dimming. Therefore, a high clock frequency may be advantageous to store the information in the flip-flop of the shift-register before triggering the update signal.

Advantageously, by providing registers (e.g., D-flip-flops according to FIG. 4) in daisy-chain manner (one pixel driving the next one) and arrange those registers together with the respective pixel cells, a single line suffices to convey the data signal Data_i to a sequence of pixels, whereas otherwise each pixel would require a separate connection to convey the data signal for controlling this pixel.

It is noted that any sort of register or memory may be used to achieve the result described above. The register may be a flip-flop, a latch, register or any other element with a memorizing functionality.

Figure 5:
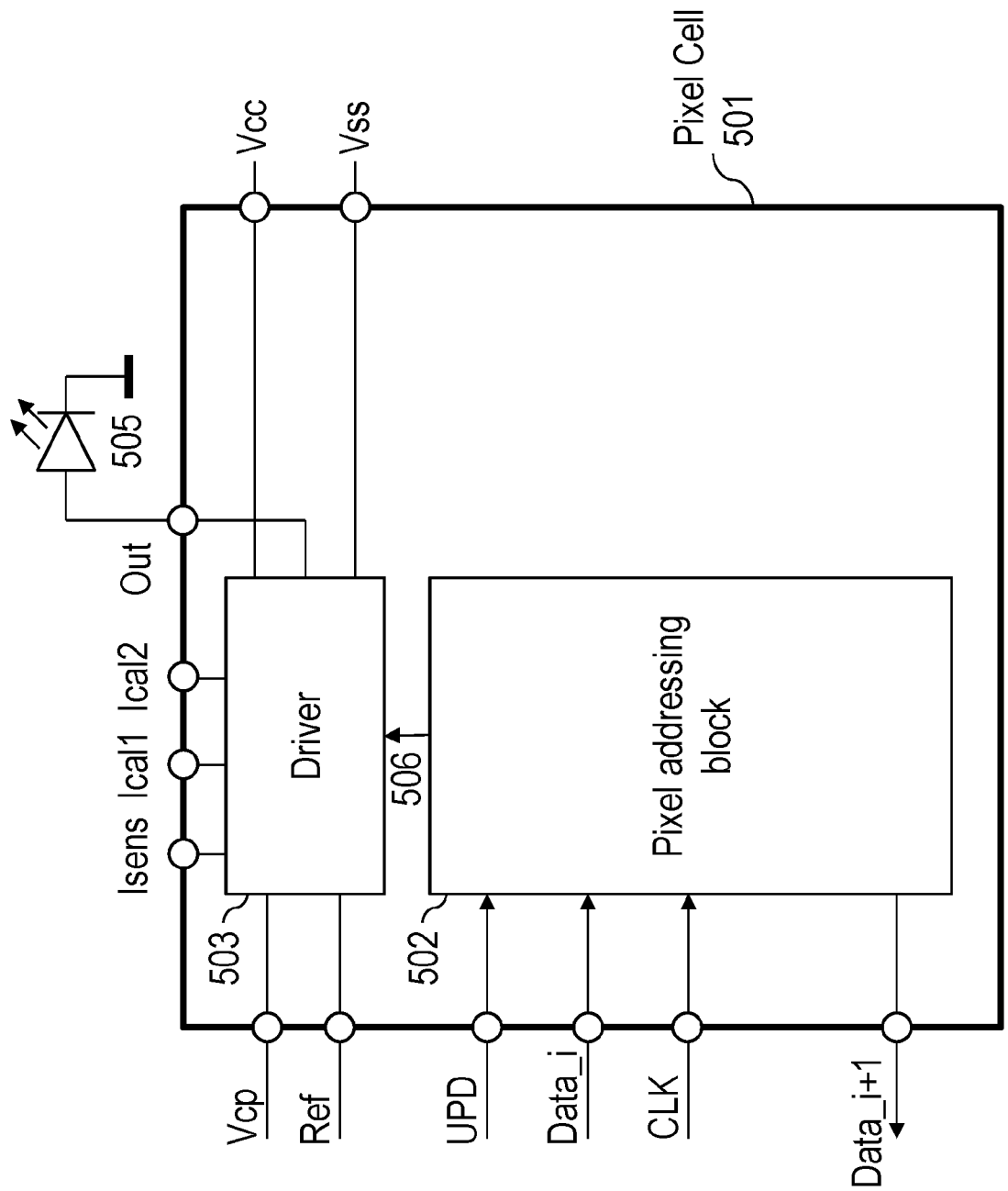
FIG. 5 shows an exemplary implementation of the driver in the pixel cell.

FIG. 5 shows a schematic block diagram of a pixel cell 501 comprising a pixel addressing block 502 and a driver 503.

The pixel cell 501 may correspond to a portion of the semiconductor device having the surface area of a pixel of the LED array. The pixel cell 501 may provide a terminal Out that can be connected to the light source, e.g., an LED 505 of the LED array. The light source may be directly mounted onto the semiconductor device, e.g., above the pixel cell 501. Hence, the LED mounted on the semiconductor device can be regarded as an integral part of the pixel cell. As an option, the term pixel cell may refer to the piece of the semiconductor device that is associated with a single LED, which may be mounted onto this piece of the semiconductor device. It is noted that the pixel cell 501 may be part of the semiconductor device 102, in particular the LED driver matrix 202. In one embodiment, the pixel cell 501 may correspond to the LED driver matrix 202 according to FIG. 2.

The driver 503 is supplied by a voltage Vcp and a voltage Vcc over the respective terminals Vcp and Vcc. Also, a reference current Iref or a reference signal is conveyed to the pixel cell 501 and to the driver 503 via a terminal Ref. The reference current Iref or the reference signal may be supplied by the common circuitry 203, e.g., via a current source arranged with this common circuitry 203 or with the pixel cell 501 (i.e. the driver 503). The driver 503 is connected to ground via a terminal Vss.

In addition, the driver 503 receives a signal 506 from the pixel addressing block 502 and supplies its output signal to drive the respective light source via the terminal Out.

Figure 7:
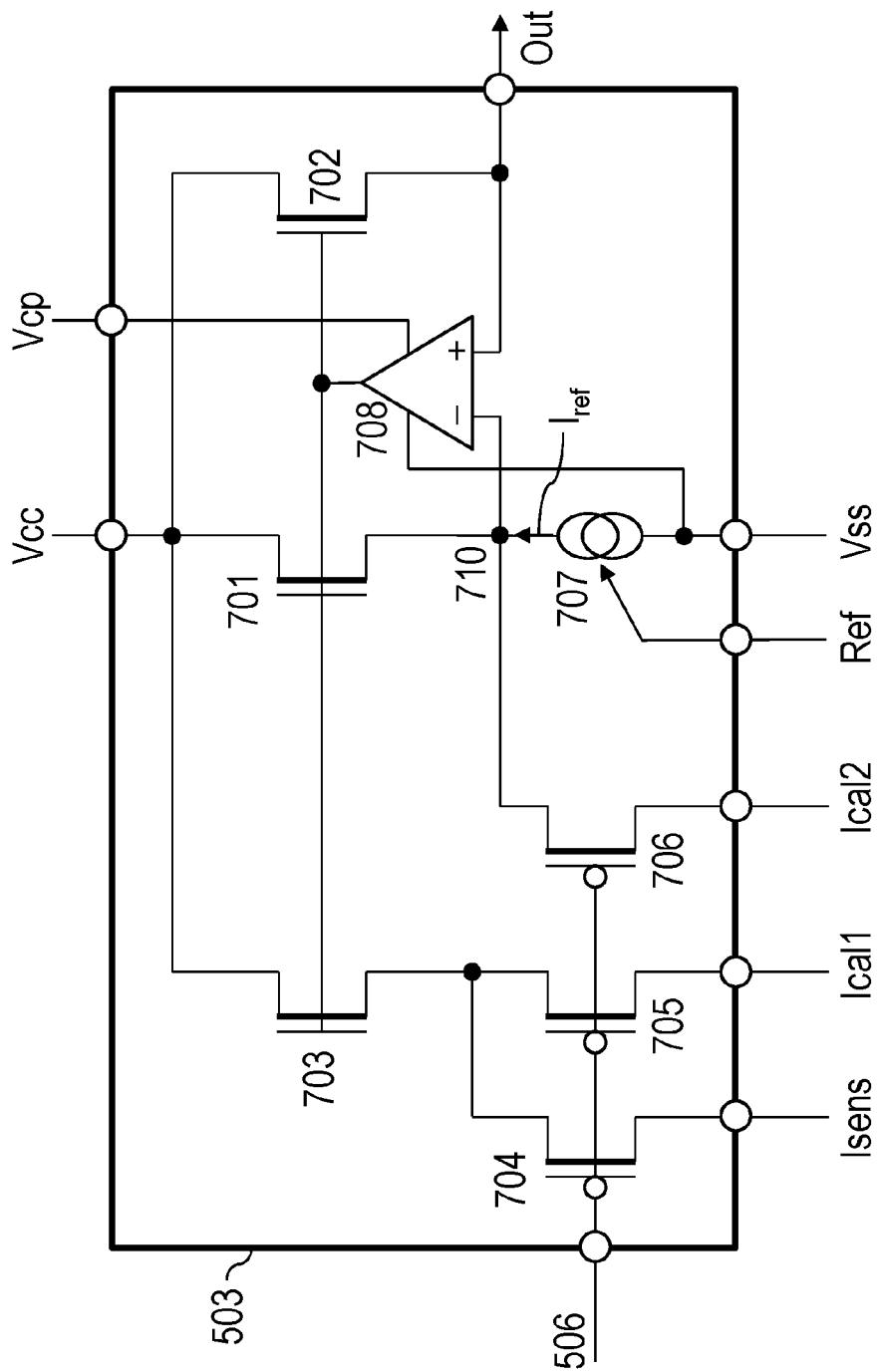
FIG. 7 shows an exemplary implementation of the driver.

The driver 503 is connected to terminals Isens, Ical1 and Ical2, which will be explained later with regard to FIG. 7 showing the driver 503 in more detail.

The pixel addressing block 502 obtains the update signal UPD, the data signal Data_i and the clock signal CLK via the respective terminals shown in FIG. 5. It provides the data signal Data_i+1 via the respective terminal for a subsequent pixel cell (or for the common circuitry if there is no subsequent pixel cell).

Further, the pixel addressing block 502 supplies the signal 506 to the driver 503. The basic functionality of the pixel addressing block 502 is explained with regard to FIG. 4 and FIG. 6.

As an option, all connections to/from the pixel cell 501 may be with the common circuitry, except for the terminal Out, which is connected to the LED 505 that may be mounted on top of the pixel cell 501.

Figure 6:
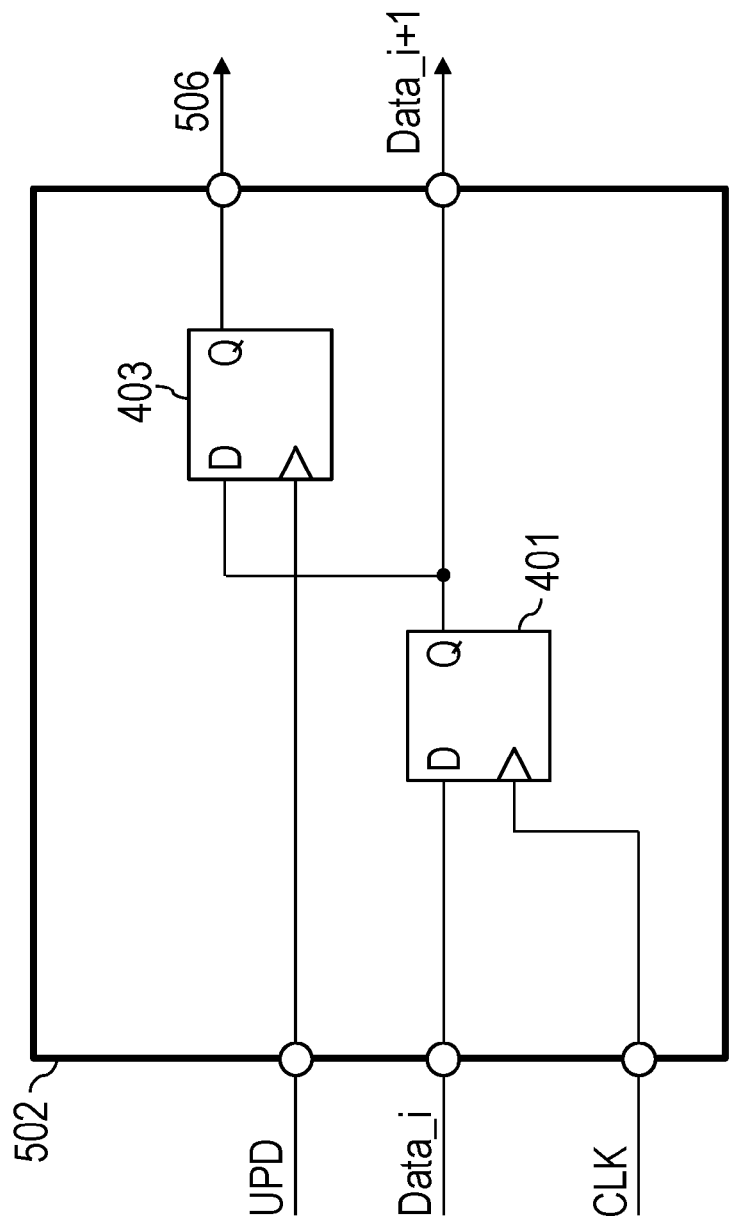
FIG. 6 shows an exemplary implementation of the pixel addressing block.

FIG. 6 shows an exemplary implementation of the pixel addressing block 502. Reference is also made to FIG. 4 above, which explains the shift registers operating between several pixel cells in more detail.

The Q-output of the D-flip-flop 403 conveys the signal 506 to the driver 503. The Q-output of the D-flip-flop 401 provides the subsequent data signal Data_i+1.

FIG. 7 shows an exemplary implementation of the driver 503. The signal 506 from the pixel addressing block 502 is conveyed to the gates of p-channel MOSFETs 704, 705 and 706. The signal 506 may be a signal to select the particular pixel cell 501; it could be supplied by the pixel addressing block 502 as explained above or it may be supplied by the common circuitry 203, e.g. by means of a multiplexer or the like, which can be used to directly or indirectly access the respective pixel cell. It is also an option that not every pixel cell of the LED array has to be accessed for offset compensation purposes.

The source of the MOSFET 704 is connected to the source of the MOSFET 705 and to the source of a n-channel MOSFET 703. The drain of the MOSFET 704 is connected to a terminal Isens and the drain of the MOSFET 705 is connected to a terminal Ical1. The drain of the of the MOSFET 706 is connected to a terminal Ical2. These terminals Isens, Ical1 and Ical2 are also terminals of the pixel cell 501 as shown in FIG. 5.

The gate of the MOSFET 703 is connected to the gate of an n-channel MOSFET 701 and to the gate of an n-channel MOSFET 702. The drains of the MOSFETs 701 to 703 are connected with each other and further to a terminal Vcc to which the supply voltage is connected to.

The source of the MOSFET 701 is connected to a node 710. The node 710 is connected to the source of the MOSFET 706 and via a controlled current source 707 to ground Vss (indicated by the terminal Vss). The current source 707 is controlled via a signal that is supplied by the terminal Ref.

The node 710 is also connected to a negative input of an operational amplifier 708 (which is also referred to as an error amplifier). The positive input of the operational amplifier 708 is connected to the source of the MOSFET 702 and to the terminal Out. The output of the operational amplifier is connected to the gates of the MOSFETs 701 to 703.

The operational amplifier 708 is supplied via a terminal Vcp with a charge-pump voltage, which may be higher than the supply voltage Vcc. Also, the operational amplifier is connected to ground, e.g., via the terminal Vss.

The MOSFET 702 acts as an NMOS power stage and the MOSFET 701 in combination with the MOSFET 703 act as an NMOS sense cell. The gate-source voltage of the MOSFET 702 is regulated via the operational amplifier 708 based on a current supplied by the current source 707 and based on a predetermined KILIS-factor (amounting, e.g., to 100).

The KILIS-factor refers to a ratio between a load current and a sense current. The load current is KILIS-times (e.g., 100-times) higher than the sense current. In this example, the load current is conveyed across the MOSFET 702 and the sense current is a current flowing across the MOSFETs 703 and 701, respectively.

The reference current $I_{ref}$ is provided by the current source 707, which can be controlled by a reference signal provided via the terminal Ref. This reference signal can thus be supplied by the common circuitry.

Hence, the reference current $I_{ref}$ may be generated within the pixel cell 501. It is an option, to generate the reference signal remote from the pixel cell 501, e.g., on the common circuitry. It is also an option to provide a reference current for all pixel cells or for a selection of pixel cells by the common circuitry; in this example, current sources comparable to the current source 707 may be arranged on the common circuitry. It is in particular an option that for each pixel cell or group of pixel cells, a current source is arranged on the common circuitry.

It is in particular an option to provide the reference current or the reference signal (to adjust the reference current) per pixel cell, group of pixel cells, e.g., row of pixel cells and/or column of pixel cells. Generating the reference current $I_{ref}$ outside the pixel cell 501 bears the advantage that the area required on the semiconductor device required for the pixel cell can be further reduced.

Due to a mechanical stress applied to the LED array, in particular to the drivers associated with the LEDs of the LED array, an offset may be introduced which may affect the accuracy of the current driving the LEDs. Mechanical stress is one example that results in an unwanted deviation of the output signals driving the LEDs. It is noted that other effects may also have a detrimental impact on the output signals that may be subject for compensation as described herein.

As the output of each pixel cell is directly fed to its associated LED and due to the compact size of the LED array and the drivers associated with the LEDs of the LED array, the output signal (current or voltage) driving the LEDs may not be accessible from the outside, i.e. from the common circuitry. Without having the output signal available, it is difficult to compensate such offset from in an efficient manner.

An exemplary solutions suggests adjusting an offset per pixel cell (or per group of pixel cells) by introducing a sense component to the pixel cell and an adjustment circuitry to the common area (applicable for all pixel cells of the LED array).

It is in particular suggested to calibrate the pixel cells or a portion of the pixel cells as follows:

The MOSFETs 701 and 702 may have a KILIS ratio amounting to, e.g., 100 or 200, i.e. the load current through the MOSFET 702 may be 100 times the sense current through the MOSFET 701. The operational amplifier 708 is used to regulate the output current based on the reference current supplied by the controllable current source 707.

The MOSFET 703 provides an additional sensing capability together with the MOSFETs 704 to 706.

Figure 8:
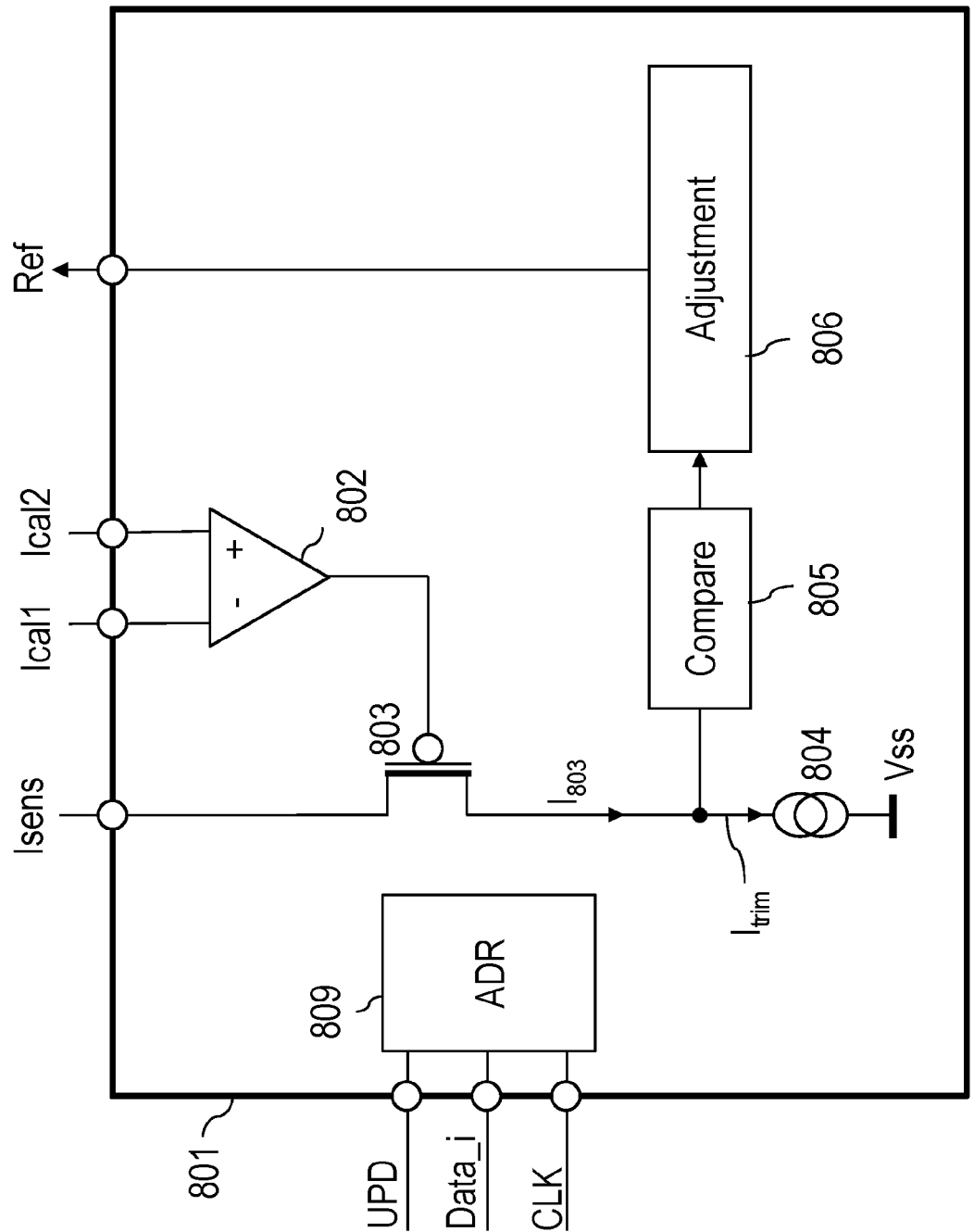
FIG. 8 shows an exemplary implementation of an adjustment circuitry, which is part of the common circuitry.

FIG. 8 shows a portion of the common circuitry used in particular as such adjustment circuitry 801 for calibrating at least one pixel cell.

An addressing device 809 is used to address at least one pixel cell. The addressing device generates the update signal UPD, data signal Data_i (e.g., a first cell to be addressed) and clock signal CLK. It may also receive the data signal Data from the last cell (not shown in FIG. 8) indicating that all cells have been processed.

As an alternative, a multiplexer could be provided within the addressing device 809, which multiplexer is arranged to address each pixel cell directly based on an address or based on a signal, e.g., a clock signal provided to such multiplexer. It is further an option, that not each pixel cell is addressed individually, but a group of pixel cells is addressed at once. It is in particular an option that one pixel cell is a representative for such a group. It is also an option that a reference current is determined and applied for the whole group of pixel cells instead of determining and applying a reference group per individual pixel cell.

The terminals Isens, Ical1, Ical2 and Ref have already been introduced with regard to FIG. 7 above and show how the adjustment circuitry 801 and the driver 503 are connected. It is an option that the adjustment circuitry 801 also comprises the terminals Vcc, Vcp and Vss. It is in particular an option that the adjustment circuitry 801 supplies the voltages Vcc and Vcp and provides a common ground potential Vss.

The terminal Isens is connected to the source of a p-channel MOSFET 803. The drain of the MOSFET 803 is connected to an input of a compare unit 805. Also, a current source 804 is connected between an input of the compare unit 805 and ground (Vss).

The terminal Ical1 is connected to a negative input of an operational amplifier 802 and the terminal Ical2 is connected to a positive input of the operational amplifier 802. The output of the operational amplifier 802 is connected to the gate of the MOSFET 803.

An output of the compare unit 805 is connected to an input of an adjustment unit 806, which has an output supplying the reference signal via the terminal Ref.

In case calibration is required (e.g., initiated by the common circuitry during start-up of the LED array or upon request from a user), an automatic routine may be initiated for all pixel cells, a selection of pixel cells or for at least one group of pixel cells by also utilizing the adjustment circuitry, which is part of the common circuitry.

In an exemplary embodiment, the MOSFETs 704 to 706 are selectively switched on (one pixel cell after the other) together via the signal 506 and the drains of the MOSFETs 704 to 706 of the respectively activated pixel cell are connected via the terminals Isens, Ical1 and Ical2 to the adjustment circuitry 801. The operational amplifier 802 on the adjustment circuitry 801 compares the signals at the terminals Ical1 and Ical2 and uses a difference between these signals to control the MOSFET 803. The operational amplifier 802 hence helps determining a sense current $I_{803}$ that is proportional to an output current provided at the terminal Out of the pixel cell 501.

The sense current $I_{803}$ that is conveyed across the MOSFET 803 is compared with the current $I_{trim}$ provided by the current source 804. The current $I_{trim}$ may correspond to the reference current $I_{ref}$ previously (or initially) determined, e.g., by the current source 707. If, e.g., due to mechanical stress, the sense current $I_{803}$ deviates from this current $I_{trim}$, the reference current $I_{ref}$ may be re-adjusted. For this purpose, the compare unit 805 determines such deviation between the currents $I_{803}$ and $I_{trim}$.

Advantageously, the operational amplifier 802 is part of the adjustment circuitry 801, which is located on the common circuitry and thus not part of the pixel cell. Therefore, the operational amplifier 802 may not be affected by the mechanical stress that impacts the LED array.

In the examples of FIG. 7 and FIG. 8, the current source 707 generating the reference current $I_{ref}$ based on a reference signal Ref is part of the driver 503 and thus part of the pixel cell 501.

It is also an option (not shown) that the reference current is generated on the adjustment circuitry. A different reference current may be generated for each pixel cell or for a selection of group of pixel cells. In such scenario, the current source 707 is located on the adjustment circuitry and is controlled via an output signal from the adjustment unit 806. The reference current $I_{ref}$ can then be supplied via the terminal Ref to the respective pixel cell, i.e. a node 710 of the driver 503.

Hence, the sense current $I_{803}$ is compared with the current $I_{trim}$ (trim current). The current $I_{trim}$ may be generated based on the same source (e.g., charge pump) as the reference current (see current source 707). The current of the current source 707 is amplified to generate the output current driving the LED of the pixel cell 501.

Advantageously, a current mirror can be provided (not shown) that supplies matching currents $I_{trim}$ as well as $I_{ref}$; hence, the current sources 804 and 707 can be matched current sources of a current mirror.

In the compare unit 805, the difference between the sense current $I_{803}$ and the trim current $I_{trim}$ is determined. Based on this difference a reference signal is determined and conveyed via the terminal Ref to control the current source 707 of the driver 503 to adjust the reference current $I_{ref}$. This is achieved via the adjustment unit 806 and will be described hereinafter:

The compare unit 805 determines whether the difference between the sense current $I_{803}$ and the trim current $I_{trim}$ is within a predetermined range, also referred to as accuracy range. Therefore, an upper threshold and a lower threshold are provided that define the accuracy range. If the difference between the sense current $I_{803}$ and the trim current $I_{trim}$ is within the accuracy range, no adjustment is required; if, however, the difference between the sense current $I_{803}$ and the trim current $I_{trim}$ is outside the accuracy range, an adjustment of the reference current is made.

Hence, the compare unit 805 works as a current comparator using the upper threshold and the lower threshold. The compare unit 805 hence supplies a digital information whether a current sensed for a pixel (corresponding to the output current that drives the LED of this pixel cell) lies within the accuracy range or not.

Based on this digital information, the adjustment unit 806 may provide a mapping for the digital information supplied by the compare unit 805 and then generate an according reference signal (adjustment value).

The adjustment unit 806 may comprise a mapping and trimming functionality. The adjustment unit 806 may comprise a lookup-table to determine a suitable reference signal based on the difference between the sense current $I_{803}$ and the trim current $I_{trim}$. The reference signal may be conveyed as the reference signal via the terminal Ref to the driver 503.

The reference signal may be used for trimming (e.g., offset compensation) those pixel cells, which use an output current to drive their associated LED(s), which output current is outside the predetermined accuracy range.

Figure 9:
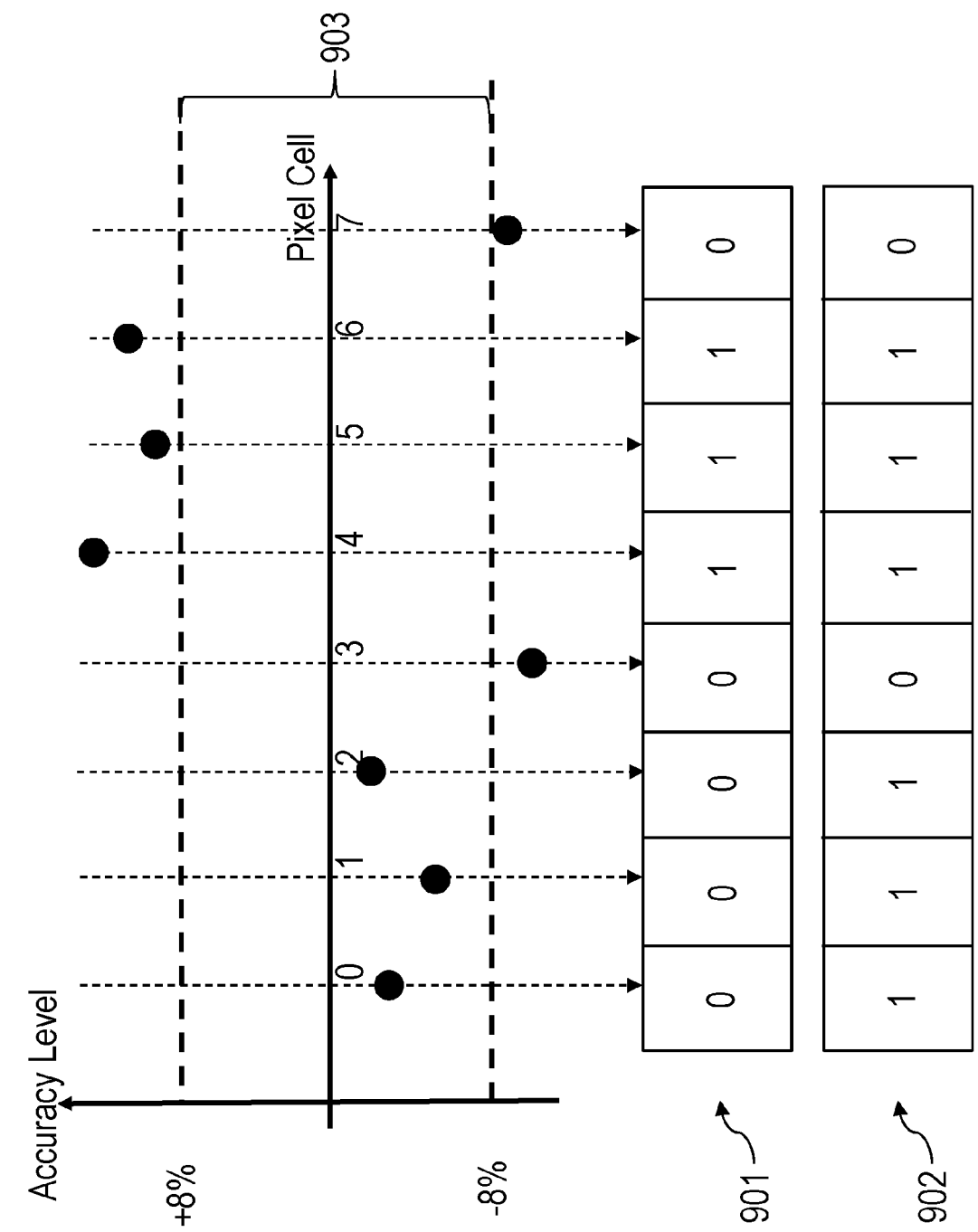
FIG. 9 shows a diagram visualizing accuracy levels for several pixel cells and how they are mapped to digital values, which influence the adjustment of the reference current, which is used to drive the light sources.

FIG. 9 shows an exemplary diagram depicting several pixel cells 0 to 7, wherein a difference between the sense current $I_{803}$ and the trim current $I_{trim}$ as determined by the compare unit 805 are indicated per pixel cell. This difference is also referred to as accuracy, e.g., a percentage value determined as: $(I_{803}-I_{trim})/I_{trim}$.

In FIG. 9, an accuracy range 903 is indicated, which may indicate a deviation of +/−8%. It is noted that the value 8% is only exemplary and other deviations can be used accordingly.

Hence, the sense current $I_{803}$ may deviate from the trim current $I_{trim}$ by more than +/−8% or it may deviate by less than +/−8% thereby falling into the accuracy range.

There are many ways to encode the information whether the respective pixel cell has a deviation within the accuracy range or outside of the accuracy range.

In the example shown in FIG. 9, two bits 901 and 902 are used; they have the following values depending on the following conditions:

bit 901 is "0": the accuracy of the respective pixel cell is below +8%;
bit 901 is "1": the accuracy of the respective pixel cell is above +8%;
bit 902 is "1": the accuracy of the respective pixel cell is above −8%;
bit 902 is "0": the accuracy of the respective pixel cell is below −8%.

The following combinations of the bits 901 and 902 exist:

| Bit 901 | Bit 902 | Meaning |
| --- | --- | --- |
| 0 | 0 | The accuracy of the pixel cell is outside of the accuracy range, i.e. below −8%: The reference current has to be increased. |
| 0 | 1 | The accuracy of the pixel cell is within the accuracy range; no adjustment is required. |
| 1 | 0 | This combination is not defined; it is not possible that the accuracy is above +8% and below −8%. |
| 1 | 1 | The accuracy of the pixel cell is outside of the accuracy range, i.e. above +8%: The reference current has to be decreased. |

In the example shown in FIG. 9, the pixel cells 0, 1 and 2 are within the accuracy range 903 and the pixel cells 3 to 7 are outside the accuracy range 903. The pixel cells 3 and 7 are below the accuracy of −8% and the pixel cells 4 to 6 are above the accuracy of +8%.

Increasing or decreasing the current can be achieved via the reference signal supplied by the adjustment unit 806 towards the terminal Ref. The driver 503 in the respective pixel cell 501 uses this signal supplied via the terminal Ref to adjust the reference current $I_{ref}$ via the current source 707.

The trimming, i.e. increasing or decreasing the current, may be done in an iterative manner; for example, the measurement described above determines whether a particular pixel cell needs to be trimmed. The increase or decrease of the current may thus be applied by a predetermined amount. Then, the next measurement reveals whether the trimming was successful with regard to the accuracy of the pixel cell. If this is the case, no further trimming may be applied; if the accuracy of the pixel cell is still outside the accuracy range, a subsequent trimming step (increasing or decreasing the current) may be applied. The amount by which the current is increased or decreased per iteration stage may vary or it may be constant. It is in particular an option to adjust the current based on the amount by which the accuracy of the pixel cell lies outside the accuracy range.

It is also an option, however, that not all pixel cells of the LED array have a driver that is equipped with means for adjusting the reference current $I_{ref}$ based on the output current supplied towards the terminal Out. Instead, only a selection of pixel cells may be equipped with such a driver. This selection may be responsible for adjusting the reference current $I_{ref}$ for a group of pixel cells.

Hereinafter, an exemplary trimming approach is described that does not require to trim each pixel cell separately, but may adjust at least one group, wherein the at least one group comprises at least two pixel cells. Such trimming approach bears the advantage that the overhead for trimming the pixel cells can be significantly reduced, which is in particular beneficial with regard to the area required on the silicon for the driver and/or the adjustment circuitry.

This may be achieved, e.g., by the following approach:
(1) The pixel cells are divided into groups. A maximum accuracy mismatch may be admissible for the pixel cells of each group. For example, a group may be defined as a matrix comprising 16 pixel cells (e.g., a 4-times-4-matrix of pixel cells) and the group may have to provide an accuracy of less than 0.5%. An LED array comprising 256 pixel cells may be divided into 16 groups, each having 16 pixel cells; the total accuracy may then result in 0.5%*16=8%; hence, the LED array of 256 pixel cells has an accuracy of ±8%. It is noted that these figures are examples and other sizes of LED arrays and/or groups of pixel cells may apply accordingly.
(2) It is determined which group falls out of the accuracy range (as explained above for the pixel cells). Trimming (adjustment) may then be applied to such groups only.

This approach is in particular useful in case the pixel cells are similar to each other, which can be expected based on the structure described with regard to FIG. 1 and FIG. 2.

Figure 10:
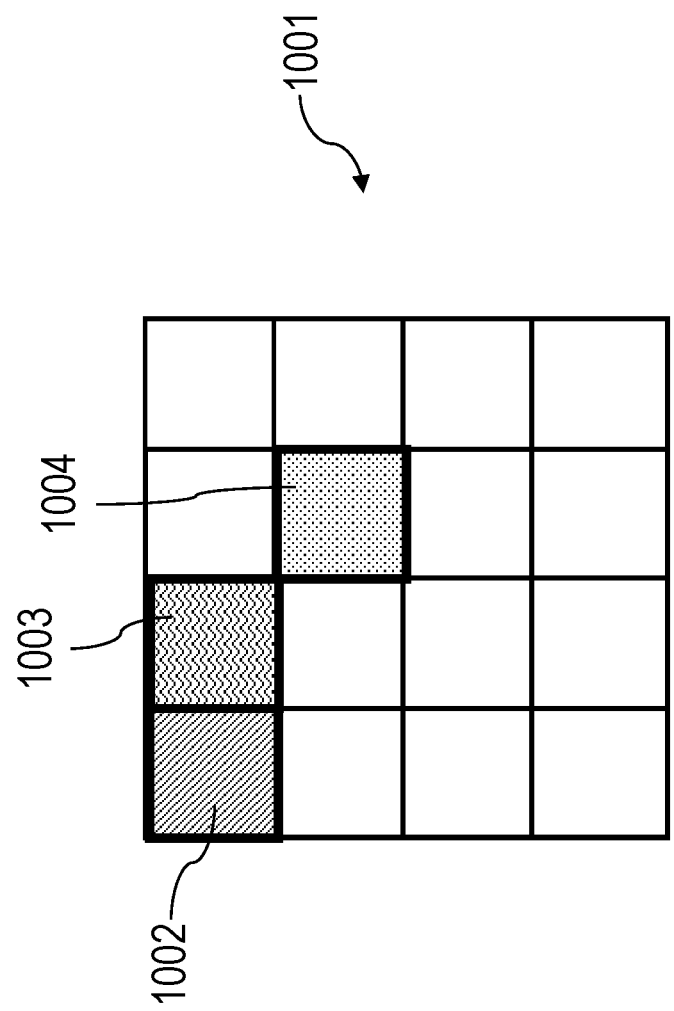
FIG. 10 shows an exemplary grouping of LEDs of the LED array.

FIG. 10 shows an exemplary diagram comprising an LED array 1001 with 256 pixel cells, which are divided into 16 groups, each group comprising 16 pixel cells. The trimming described herein may be conducted per pixel cell or per group of pixel cells. For example, for each of the groups 1002, 1003 and 1004 the pixel cells within the respective group are trimmed together. Hence, an offset is corrected in the same way for all pixel cells of one group. This may apply to all 16 groups of the LED array 1001 or to a selection of such groups.

The solution presented in particular bears the advantage that an accuracy of the LED array can be increased in an efficient way. For example, offsets can be (at least partially) compensated, in particular offsets that stem from mechanical stress applied to the LED array (i.e. the LED array or the semiconductor device to which the LEDs are connected).

Hence, examples provided herewith relate to a calibration for reducing or at least partially compensating any offset that is introduced based on mechanical stress applied to the LED assembly (LED array and/or semiconductor device). Such mechanical stress may in particular be a result of an assembling process of the LED assembly. The reduction of the offset or the detrimental effect that is caused by the offset may at least partially be provided by the adjustment circuitry, which is part of the common circuitry. It is also an option to introduce a digital mapping and a logic decision based on such digital mapping to determine which pixel cell or group of pixel cells is to be trimmed. Such trimming (or adjustment) may be conducted based on a predetermined mismatch expected.

The examples suggested herein may in particular be based on at least one of the following solutions. In particular combinations of the following features could be utilized in order to reach a desired result. The features of the method could be combined with any feature(s) of the device, apparatus or system or vice versa.

A device is provided for driving several light sources, wherein the several light sources are arranged in a light matrix structure, wherein:
  the device comprises a common circuitry and a driver matrix;
  each cell of the driver matrix is connected to at least one cell of the light matrix structure;
  a sense component is provided on a cell of the driver matrix, wherein the sense component determines a sense signal that is based on, and in particular dependent on or proportional to, an output signal driving the light source that is connected to this cell of the driver matrix; and
  the common circuitry comprises an adjustment circuitry that is arranged
    for obtaining the sense signal;
    for adjusting a reference signal; and
    for conveying the reference signal to the cell of the driver matrix that determined the sense signal;
  wherein the cell of the driver matrix is arranged for adjusting the output signal driving the light source based on the reference signal.

This solution bears the advantage that an accuracy of the light matrix structure can be increased in an efficient way. For example, offsets can (at least partially) be compensated, in particular offsets that stem from mechanical stress applied to the light matrix structure and/or the driver matrix.

Hence, a calibration may be achieved for reducing or at least partially compensating any offset that is introduced based on mechanical stress effects. Adjusting the offset may at least partially be provided by the adjustment circuitry, which is part of the common circuitry. This bears the advantage that some components that are used for calibration purposes are supplied external to the cells of the driver matrix, where additional space is available. Furthermore, such centralized components can be used for several cells of the driver matrix, i.e. a part of the calibration functionality does not have to be implemented for each cell of the driver matrix, which saves costs and reduces the manufacturing effort.

It is an option however, that the common circuitry contains only the adjustment circuitry. It is also an option that the common circuitry comprises additional components that may be used for controlling the light sources of the light matrix structure.

The sense signal may be a current or a voltage indicating the actual output signal that drives the light source of the cell.

The reference signal may be a current or a voltage for controlling a current source or it may be an output of a current source that is used for adjusting the output signal driving the light source.

In an embodiment, the sense component comprises at least one sense transistor that is arranged to mirror a current of the output signal towards the light source.

The at least one sense transistor may be a MOSFET that is arranged with a predetermined KILIS ratio to a transistor providing the output signal.

In an embodiment, the common circuitry is arranged for adjusting the reference signal
 by determining a difference between the sense signal and a predefined trim signal; and
 by adjusting the reference signal based on whether the difference fulfills a predetermined condition.

In an embodiment, adjusting the reference signal comprises:
 indicating an increase of the output signal in case the sense signal is below the trim signal;
 indicating a decrease of the output signal in case the sense signal is above the trim signal; and
 indicating no change of the output signal in case the sense signal equals or is substantially equal to the trim signal.

In an embodiment, adjusting the reference signal comprises:
 determining an accuracy based on the sense signal and the trim signal;
 indicating an increase of the output signal in case the accuracy is below a lower threshold;
 indicating a decrease of the output signal in case the accuracy is above a higher threshold;
 indicating no change of the output signal in case the accuracy is within an accuracy range limited by the lower threshold and the upper threshold.

The accuracy may be determined as follows: (sense signal−trim signal)/trim signal.

Hence, it is an option to introduce a digital mapping and a logic decision based on such digital mapping to determine which pixel cell or group of pixel cells is to be trimmed. Such trimming (or adjustment) may be conducted based on a predetermined mismatch (accuracy range) expected.

In an embodiment, the reference signal is used to adjust a current source that is located on the cell of the driver matrix.

In an embodiment, the reference signal is a current that is provided by a current source, which is located on the common circuitry. In some examples, the reference signal may comprise the current that is provided by the current source.

In an embodiment, the common circuitry is further arranged for addressing a cell of the driver matrix, in particular each cell of the driver matrix or a group of cells of the driver matrix.

Such group may be a sub-matrix of the driver matrix or it may be a row of cells of the driver matrix or a column of cells of the driver matrix.

In an embodiment, the driver matrix is arranged below the light matrix structure.

It is noted that the expression "below" in this regard may refer to the opposite side to which the light sources emit the light. If the light emission occurs on a top side of the light matrix structure, the bottom side of the light matrix structure may be connected to the driver matrix. In particular, each cell of the driver matrix may be connected with one light source of the light matrix structure. It is noted that the light source of the light matrix structure may comprise at least one semiconductor lighting element, e.g., at least one LED and/or OLED.

In an embodiment, the common circuitry and the driver matrix are arranged on one semiconductor device, which is arranged below the light matrix structure.

It is in particular an option that the common circuitry is provided adjacent to the driver matrix. The common circuitry and the driver matrix may also be arranged on separate semiconductor devices (dies or chips). The common circuitry may provide functionalities (power supply, etc.) for the light sources of the light matrix structure.

In an embodiment, the device is arranged to iteratively determine the sense signal, adjust the reference signal and adjust the output signal until a termination condition is met.

The termination condition may be a predetermined number of iterations, an adjustment of the reference signal that is less than a predetermined threshold (e.g., no adjustment necessary) or the like.

In an embodiment, the driver matrix comprises a driver for each light source of the light matrix structure.

In an embodiment, each light source comprises at least one semiconductor light source, in particular at least one LED.

In an embodiment, the device is an integrated circuit, in particular realized as a single chip. In some examples, the device may comprise an integrated circuit, in particular realized as a single chip.

Also, a method for driving several light sources is suggested, wherein the several light sources are arranged in a light matrix structure, wherein each cell of a driver matrix is connected to at least one cell of a light matrix structure and wherein a common circuitry comprises an adjustment circuitry, the method comprising the steps:
 determining a sense signal that is based on, and in particular dependent on or proportional to, an output signal driving the light source that is connected to this cell of the driver matrix, wherein the sense signal is determined by a sense component that is provided on a cell of the driver matrix;
 obtaining the sense signal by the adjustment circuitry;
 adjusting a reference signal by the adjustment circuitry;
 conveying the reference signal from the adjustment circuitry to the cell of the driver matrix that determined the sense signal; and
 adjusting, by this cell of the driver matrix, the output signal driving the light source based on the reference signal.

In an embodiment, adjusting the reference signal comprises:
 determining a difference between the sense signal and a predefined trim signal; and
 adjusting the reference signal based on whether the difference fulfills a predetermined condition.

In an embodiment, adjusting the reference signal comprises:
 indicating an increase of the output signal in case the sense signal is below the trim signal;
 indicating a decrease of the output signal in case the sense signal is above the trim signal; and indicating no change of the output signal in case the sense signal equals or is substantially equal to the trim signal.

In an embodiment, adjusting the reference signal comprises:

determining an accuracy based on the sense signal and the trim signal;
indicating an increase of the output signal in case the accuracy is below a lower threshold;
indicating a decrease of the output signal in case the accuracy is above a higher threshold; and
indicating no change of the output signal in case the accuracy is within an accuracy range limited by the lower threshold and the upper threshold.

In an embodiment, the method may further comprise using the reference signal to adjust a current source that is located on the cell of the driver matrix.

A computer-readable medium having computer-executable instructions adapted to cause a computer system to:

determine a sense signal that is based on, and in particular dependent on or proportional to, an output signal driving the light source that is connected to this cell of the driver matrix, wherein the sense signal is determined by a sense component that is provided on a cell of the driver matrix;
obtain the sense signal by the adjustment circuitry;
adjust a reference signal by the adjustment circuitry;
conveying the reference signal from the adjustment circuitry to the cell of the driver matrix that determined the sense signal; and
adjust, by this cell of the driver matrix, the output signal driving the light source based on the reference signal.

It is noted that the features described above with regard to the device are accordingly applicable for the method as well.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for driving several light sources, wherein the several light sources are arranged in a light matrix structure, wherein:
the device comprises a common circuitry and a driver matrix;
each cell of the driver matrix is connected to at least one cell of the light matrix structure;
a sense component is provided on a cell of the driver matrix, wherein the sense component determines a sense signal that is based on, and in particular dependent on or proportional to, an output signal driving the light source that is connected to this cell of the driver matrix; and
the common circuitry comprises an adjustment circuitry that is arranged
for obtaining the sense signal;
for adjusting a reference signal; and
for conveying the reference signal to the cell of the driver matrix that determined the sense signal,
wherein the cell of the driver matrix is arranged for adjusting the output signal driving the light source based on the reference signal.

2. The device of claim 1, wherein the sense component comprises at least one sense transistor that is arranged to mirror a current of the output signal towards the light source.

3. The device of claim 1, wherein the common circuitry is arranged for adjusting the reference signal by at least:
determining a difference between the sense signal and a predefined trim signal; and
adjusting the reference signal based on whether the difference fulfills a predetermined condition.

4. The device of claim 3, wherein adjusting the reference signal comprises:
indicating an increase of the output signal in case the sense signal is below the trim signal;
indicating a decrease of the output signal in case the sense signal is above the trim signal; and
indicating no change of the output signal in case the sense signal equals or is substantially equal to the trim signal.

5. The device of claim 3, wherein adjusting the reference signal comprises:
determining an accuracy based on the sense signal and the trim signal;
indicating an increase of the output signal in case the accuracy is below a lower threshold;
indicating a decrease of the output signal in case the accuracy is above a higher threshold; and
indicating no change of the output signal in case the accuracy is within an accuracy range limited by the lower threshold and the upper threshold.

6. The device of claim 1, wherein the reference signal is used to adjust a current source that is located on the cell of the driver matrix.

7. The device of claim 1, wherein the reference signal comprises a current that is provided by a current source, which is located on the common circuitry.

8. The device of claim 1, wherein the common circuitry is further arranged for addressing a cell of the driver matrix, in particular each cell of the driver matrix or a group of cells of the driver matrix.

9. The device of claim 1, wherein the driver matrix is arranged below the light matrix structure.

10. The device of claim 1, wherein the common circuitry and the driver matrix are arranged on one semiconductor device, which is arranged below the light matrix structure.

11. The device of claim 1, wherein the device is arranged to iteratively determine the sense signal, adjust the reference signal and adjust the output signal until a termination condition is met.

12. The device of claim 1, wherein the driver matrix comprises a driver for each light source of the light matrix structure.

13. The device of claim 1, wherein each light source comprises at least one semiconductor light source, in particular at least one LED.

14. The device of claim 1, wherein the device comprises an integrated circuit, in particular realized as a single chip.

15. A method for driving several light sources, wherein the several light sources are arranged in a light matrix structure, wherein each cell of a driver matrix is connected to at least one cell of a light matrix structure and wherein a common circuitry comprises an adjustment circuitry, the method comprising the steps:

determining a sense signal that is based on, and in particular dependent on or proportional to, an output signal driving the light source that is connected to this cell of the driver matrix, wherein the sense signal is determined by a sense component that is provided on a first cell of the driver matrix;

obtaining the sense signal by the adjustment circuitry;

adjusting a reference signal by the adjustment circuitry;

conveying the reference signal from the adjustment circuitry to the first cell of the driver matrix that determined the sense signal; and adjusting, by the first cell of the driver matrix, the output signal driving the light source based on the reference signal.

16. The method of claim 15, wherein adjusting the reference signal comprises:

determining a difference between the sense signal and a predefined trim signal; and adjusting the reference signal based on whether the difference fulfills a predetermined condition.

17. The method of claim 16, wherein adjusting the reference signal comprises:

indicating an increase of the output signal in case the sense signal is below the trim signal;

indicating a decrease of the output signal in case the sense signal is above the trim signal; and indicating no change of the output signal in case the sense signal equals or is substantially equal to the trim signal.

18. The method of claim 16, wherein adjusting the reference signal comprises:

determining an accuracy based on the sense signal and the trim signal;

indicating an increase of the output signal in case the accuracy is below a lower threshold;

indicating a decrease of the output signal in case the accuracy is above a higher threshold; and indicating no change of the output signal in case the accuracy is within an accuracy range limited by the lower threshold and the upper threshold.

19. The method of claim 15, further comprising using the reference signal to adjust a current source that is located on the cell of the driver matrix.

20. A computer-readable medium having computer-executable instructions adapted to cause a computer system to perform the steps of the method according to claim 15.

* * * * *